United States Patent [19]

Aisley

[11] 4,396,249

[45] Aug. 2, 1983

[54] ADJUSTABLE MOUNTING SUPPORT FOR MIRRORS

[75] Inventor: William J. Aisley, Malibu, Calif.

[73] Assignee: Jensen General Corp., Los Angeles, Calif.

[21] Appl. No.: 280,560

[22] Filed: Jul. 6, 1981

[51] Int. Cl.$^3$ .......................... A47B 67/02; G02B 7/18

[52] U.S. Cl. .................................... 350/306; 248/476; 248/289.1; 312/227

[58] Field of Search ............... 350/306, 305, 299, 292, 350/288, 303, 304; 248/486, 476, 289.1; 312/227, 226

[56] References Cited

U.S. PATENT DOCUMENTS

| | | | |
|---|---|---|---|
| 1,006,481 | 10/1911 | Johnson et al. | 350/306 |
| 1,078,502 | 11/1913 | Herrmann | 350/306 |
| 1,088,765 | 3/1914 | Booth | 350/305 |
| 2,557,037 | 6/1951 | Rooney | 312/227 |
| 2,678,252 | 5/1954 | Swearingen | 350/306 |
| 2,763,186 | 9/1956 | Barlow | 350/306 |
| 3,771,854 | 11/1973 | Roark | 248/486 |

FOREIGN PATENT DOCUMENTS

| | | | |
|---|---|---|---|
| 522475 | 10/1953 | Belgium | 350/306 |

*Primary Examiner*—Jon W. Henry

*Attorney, Agent, or Firm*—Harlan P. Huebner

[57] ABSTRACT

Adjustable side mirrors flanking a central cabinet door mirror are supported by frames formed as stampings from sheet material so as to permit the side mirrors to be pivotally adjusted from positions in the same plane with the central mirror into both adjacent angular relationships with the central mirror and into remote angular relationships therewith.

8 Claims, 9 Drawing Figures

ADJUSTABLE MOUNTING SUPPORT FOR MIRRORS

BACKGROUND OF THE INVENTION

1. Field of the Invention

The present invention relates to adjustable mounting supports for mirrors and the like and more particularly to improvements in mounting supports for adjustable mirrors of the type commonly positioned at opposite sides of a bathroom medicine cabinet mirror.

2. Description of the Prior Art

While adjustable side mirrors have commonly been positioned on fixed pivots flanking a central cabinet mirror such as one on the door of a medicine cabinet, efforts have been made to provide side mirror mountings permitting a wide range of adjustment of such side mirrors. The Booth U.S. Pat. No. 1,088,765 and the Roark U.S. Pat. No. 3,771,854 are examples of such mounting arrangements for side mirrors.

A need has existed, however, for a simple assembly fabricated from formed sheet metal stampings and capable of easy attachment to standard types of wall-mounted cabinets or equivalent frame supports. It is the primary object of the present invention to provide such a device.

SUMMARY OF THE INVENTION

According to the present invention, a pivotable arm is formed as a stamping from sheet material with ears adjacent its opposite ends extending normal to the plane of the arm and oppositely with respect to each other.

A mounting bracket, also formed as a stamping from sheet material, is provided with an ear which is pivotally attached to one of the ears of said arm, and is adapted for mounting on an end of the frame of a wall-mounted cabinet so that the ear extends laterally beyond the cabinet and the plane of the arm parallels the adjacent wall.

A mirror support bracket, also formed as a stamping from sheet material, is provided with an ear which is pivotally attached to the other ear of said arm, and is adapted for attachment to the frame of a mirror in such a position as to be pivotable, when so attached, into nesting relationship with said other ear and the portion of the arm from which said ear extends.

In the preferred form of the invention two such arm and bracket assemblies, one the mirror image of the other, are connected by a strut in box beam form, spot welded to each arm intermediate its ends, and a mirror is supported by both the upper and lower mirror support brackets. Such a two-arm assembly when inverted within a vertical plane may be used on the opposite side of a cabinet without modification.

In use, the device of the present invention permits a mirror mounted by it to be pivoted around a vertical axis on the mounting bracket, a vertical axis on the mirror support bracket, or both, to a wide variety of positions. Normally positioned coplanar with the cabinet face, however, the side mirror or mirrors lie closely adjacent their support.

DESCRIPTION OF THE PREFERRED EMBODIMENT

Figure 1:
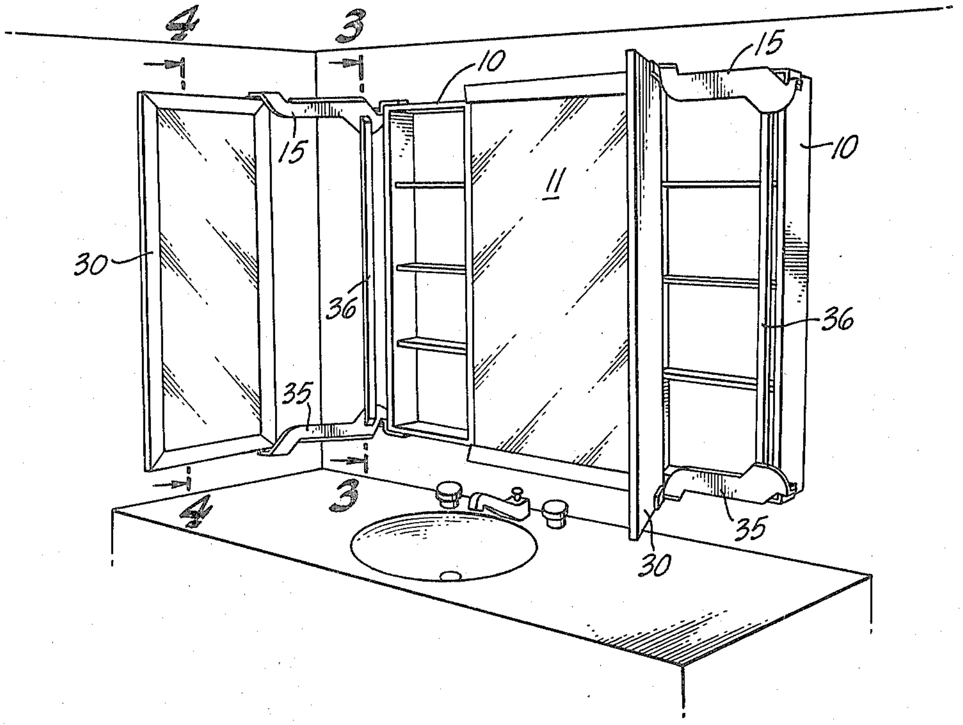
FIG. 1 is a view in perspective of a cabinet installation over a wash stand of two double arm assemblies embodying the present invention.

As shown in FIG. 1, the adjustable mounting support of the present invention is designed to be secured to wall-mounted cabinets 10 which preferably are duplicated on opposite sides of a cabinet mirror 11 integral with the edge-hinged door of a medicine cabinet.

The adjustable mounting support comprises a vertically planar arm section 15 which may be formed as a stamping from sheet material and preferably includes an angularly disposed reinforcing flange 16. At its opposite ends the arm section 15 is provided with horizontal, oppositely extending ears 17 and 18.

An angular mounting bracket 20 is provided with elonaged slots 21 for adjustably mounting its anchor portion 22 on the frame of cabinet 10, and an ear 23 which, when the bracket is so mounted, extends laterally beyond the end of the frame. Ears 17 and 23 are pivotally connected at 25 so that the arm 15 may swing from an open position, such as that in which it is shown in FIGS. 1, 2, 3, 4 and 9, to a closed position, in which it is shown in FIGS. 5, 6, 7 and 8, in which the flange 16 overlies the frame of cabinet 10.

Figure 5:
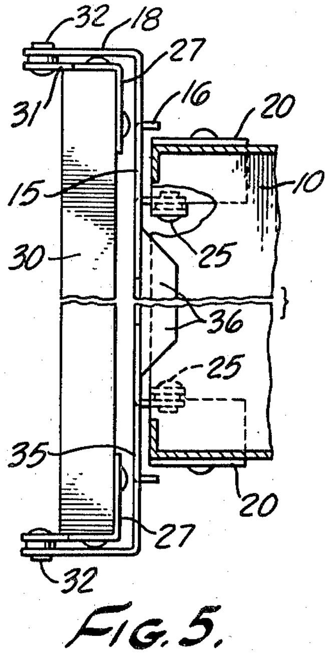
FIG. 5 is a truncated view, partly in section, taken along the line 5—5 of FIG. 3, but with the mirror folded into the arm section.
Figure 6:
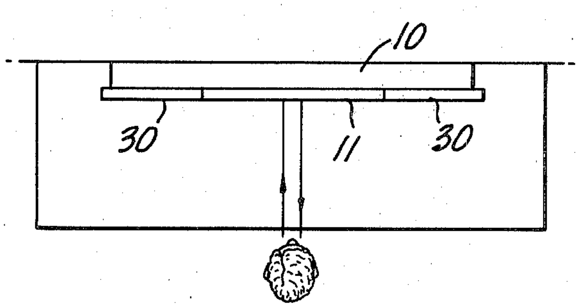
FIGS. 6, 7, 8 and 9 are diagrammatic views illustrating the optical effects of various mirror adjustments.
Figure 7:
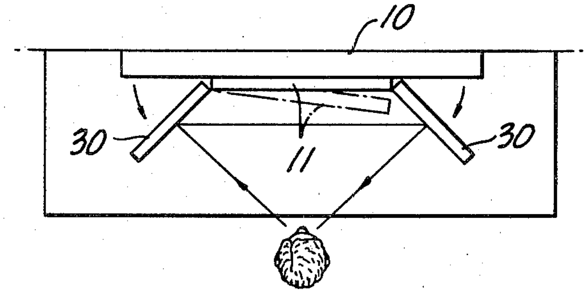
Figure 8:
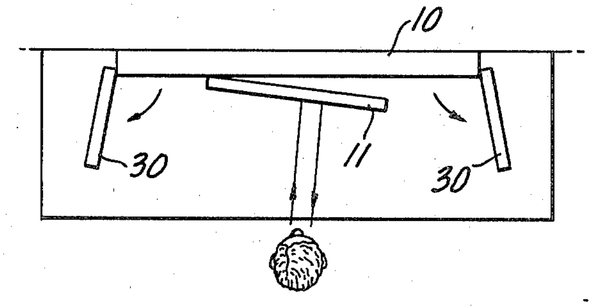
Figure 9:
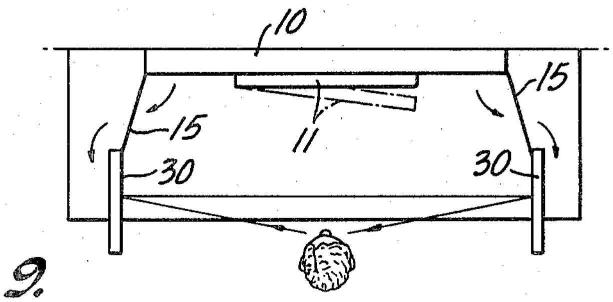

An angular mirror support bracket 27 is provided with elongated slots 28 for adjustably attaching it to the frame of a wing mirror 30, and an ear 31 which, when the bracket is so mounted, extends horizontally. Ears 18 and 31 are pivotally connected at 32 so that the wing mirror 30 may swing from an extended position in which it is shown in FIGS. 1, 2, 3, 4 and 9 to a position in which its rear surface abuts the arm 15, in which position it is shown in FIGS. 5 and 6. With the arm 15 in the closed position of FIGS. 5, 6, 7 and 8, the wing mirror 30 may swing on pivot 32 from the position of FIG. 6, to the angular positions of FIGS. 7 or 8, while the cabinet mirror 11 may pivot on its door hinge as shown in the latter figures.

Figure 2:
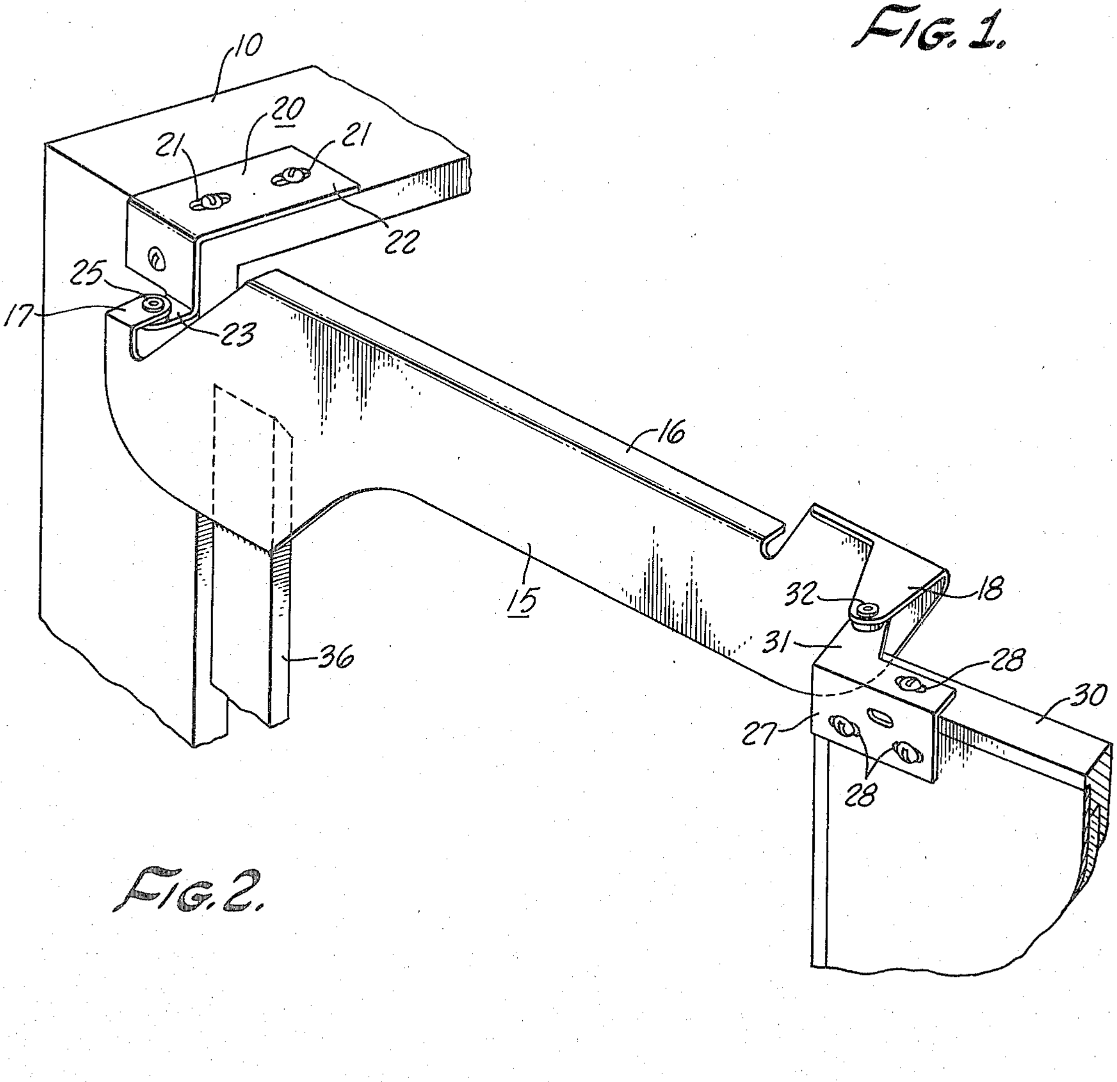
FIG. 2 is a view in perspective of a single arm assembly attached to a cabinet and mirror.
Figure 3:
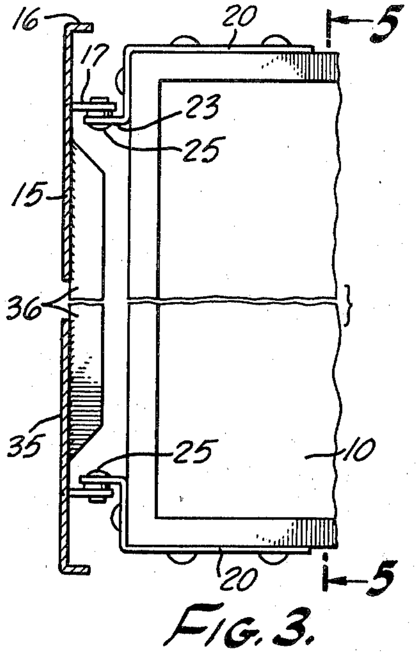
FIG. 3 is a truncated view, partly in section, taken along the line 3—3 of FIG. 1.
Figure 4:
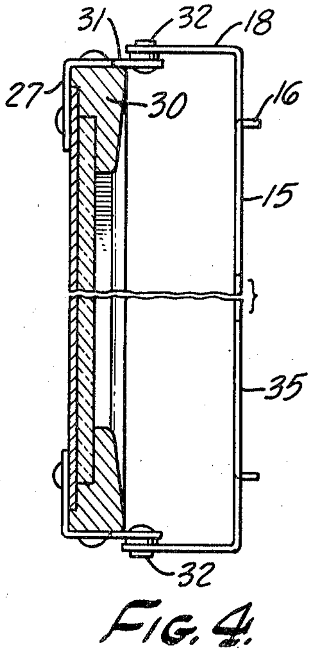
FIG. 4 is a truncated view, partly in section, taken along the line 4—4 of FIG. 1.

Preferably, the assembly just described, with the arm 15 reversed to a mirror image of the configuration shown in FIG. 2, is provided for attachment to the frame of cabinet 10 at its lower corner, as indicated at 35; the arms 15 and 35 being connected by a strut 36 in box beam form, spot welded at its ends to the arms. Also, preferably, this assembly is duplicated at the opposite side of the conventional mirror 11 as shown in FIG. 1.

It will be apparent from the foregoing that the adjustable mounting support of the present invention may be employed in various combinations to make possible adjustable mirror groupings and configurations facilitating a wide variety of view of a user.

I claim:

1. A mirror mounting support comprising a vertically planar arm section provided at its opposite ends with horizontal, first and second ears extending oppositely and normal to the plane of said arm section, a mounting bracket having a horizontally extending ear directly pivotally connected to the first ear of said arm section and an anchor portion adapted for attachment to an end of a wall-mounted frame so that the ear of said mounting bracket extends laterally beyond said frame end, a mirror support bracket having a horizontally extending ear directly pivotally connected to the second ear of said arm section and a mirror-supporting portion adapted for attachment to a mirror and pivotable into abutting relationship with respect to said vertically planar arm section and said second ear.

2. A mirror assembly comprising a pair of mirror mounting supports according to claim 1 carried by a wall-mounted cabinet at opposite sides thereof and carrying wing mirrors.

3. A mirror assembly according to claim 2 including a cabinet mirror mounted between said wing mirrors.

4. A mirror assembly according to claim 3 in which said cabinet mirror is pivotally mounted at one edge thereof.

5. A mirror mounting support comprising a pair of vertically planar arm sections vertically spaced from each other and provided at their opposite ends with horizontal, first and second ears extending oppositely and normal to the plane of said arm section, a reinforcing strut connecting said sections, a pair of mounting brackets each having a horizontally extending ear directly pivotally connected to one of said first ears of said arm sections and an anchor portion adapted for attachment to an end of a wall-mounted frame so that the ears of said mounting brackets extend laterally beyond said frame end, a pair of mirror support brackets each having a horizontally extending ear directly pivotally connected to one of said second ears of said arm sections and a mirror-supporting portion adapted for attachment to a mirror and pivotable into abutting relationship with respect to said vertically planar arm sections and said second ears.

6. A mirror assembly comprising a pair of mirror mounting supports according to claim 5 carried by a wall-mounted cabinet at opposite sides thereof and carrying wing mirrors.

7. A mirror assembly according to claim 6 including a cabinet mirror mounted between said wing mirrors.

8. A mirror assembly according to claim 7 in which said cabinet mirror is pivotally mounted at one edge thereof.

* * * * *